May 15, 1945.　　J. T. PAULSON　　2,376,270
TREE FALLER AND UNDERCUTTER
Filed April 29, 1943　　2 Sheets-Sheet 1

Inventor
John T. Paulson
By
Attorney

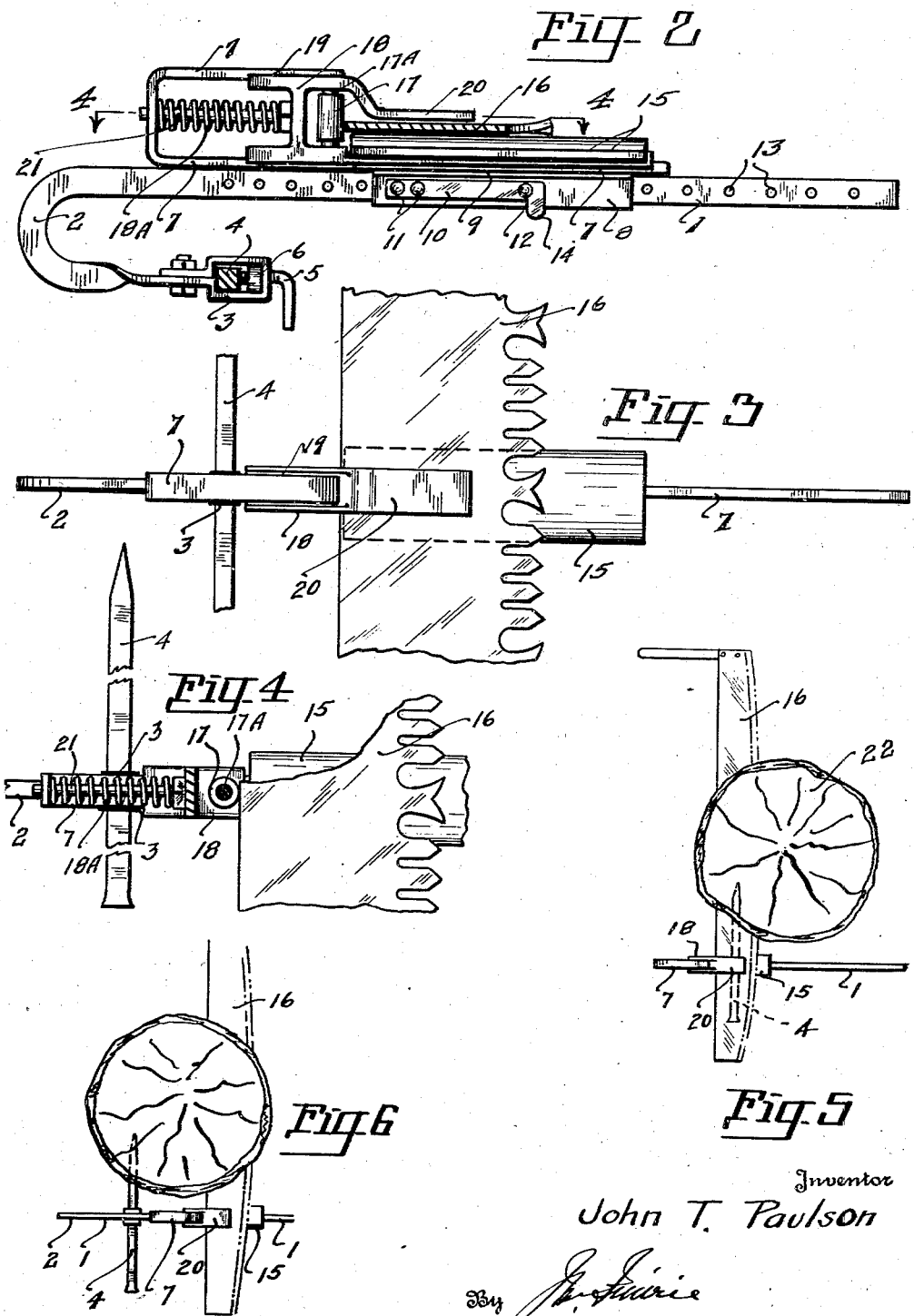

Patented May 15, 1945

2,376,270

UNITED STATES PATENT OFFICE 2,376,270

TREE FALLER AND UNDERCUTTER

John T. Paulson, Lafayette, Oreg.

Application April 29, 1943, Serial No. 485,045

3 Claims. (Cl. 143—163)

This invention relates to tree fallers and undercutters, and the primary object of the invention is to provide a device that will carry and guide the saw into the cut, requiring but one operator.

Another object of my invention is the provision of means for applying a constant pressure against the back of the saw while the operation of sawing goes on.

A further object of my invention is to provide a guide for the saw that will not injure the cutting teeth and that can be readily renewed or replaced.

A still further object of my invention is the provision of an adjusting means for adjusting the position of the saw guide as the cut progresses through the timber.

And another object of the invention is to provide means within the device for adjusting the same on a holding bar to accommodate the device to the different kinds of cuts and sizes of trees.

These and other incidental objects will be apparent in the drawings, specification and claims.

Referring to the drawings:

Figure 2 is a side elevation, partially in section, illustrating the assembled device.

Figure 3 is a fragmentary plan view of Figure 1.

Figure 4 is a plan fragmentary sectional view, taken on line 4—4 of Figure 2.

Figure 5 illustrates my new and improved tree faller and undercutter as applied to a timber in use while cutting.

Figure 6 illustrates Figure 5 in a progressed position.

In the drawings:

Figure 1:
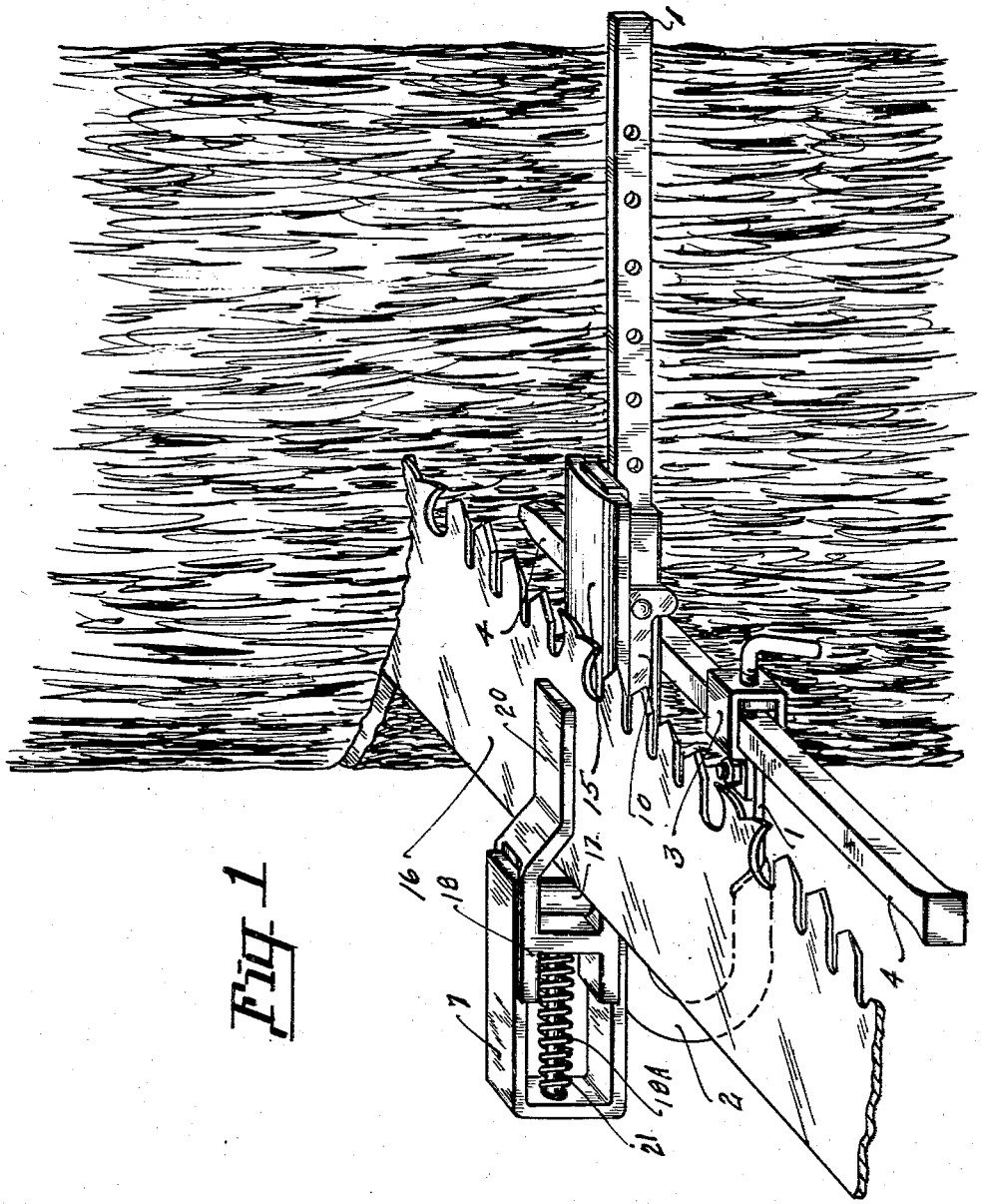
Figure 1 is a perspective view of my new and improved tree faller in operation.

My new and improved tree faller and undercutter consists of a holding bar or bracket 1, having a goose neck 2 on one of its ends terminating in a loop 3. The purpose of the loop 3 is to receive a bar 4. The bar 4 is the main supporting element of my device, and is driven into the tree, best illustrated in Figures 1, 5 and 6.

A locking set screw 5 is screwed into a nut 6 within the loop 3 and is for the purpose of holding the bar 1 relative to the bar 4, securely locking the same at any desired position. The device consists of a main frame 7 having a channel 8 secured to its underside at 9 by any suitable fastening means, as for instance being integral therewith, welded or riveted thereto. The channel 8 receives the supporting bar 1 therein. The position of the channel on the bar is maintained by a locking pin 12, secured to the spring 10, which in turn is secured to the channel by suitable fastening means, as rivets 11. The locking pin 12 passes through the channel 8 and through the holes 13 of the supporting bar.

A lip 14 forming part of the spring 10 provides a means of grasping the end of the spring and removing the pin 12 from the holes 13, thereby allowing the moving of the frame 7 along the bar 1. This adjustment is termed a coarse adjustment, one to be made at different intervals of time relative to the progress of the cutting operation.

A movable sub-frame 18 is slidably mounted within the frame 7, having a guideway 19 for maintaining it in assembled relation with the frame 7. A cross cut saw is indicated at 16 between the guide 20 and the wearing plate 15. The plate 15 is made of a material that will not injure the teeth of the saw. The wearing plate is securely fastened to the sub-frame 18 by any suitable fastening means, and is replaceable.

The sub-frame 18 carries a roller 17 journaled to the shaft 17A. This roller engages the back of the saw, and a tension is maintained thereagainst by a spring 18A, mounted to the guide pin or shaft 21, which is secured at its one end to the frame and slides through an opening in the frame on its opposite end. The pressure applied to the saw can be varied by the position of the sawyer in regards to the device, the spring 18A provides more or less of a working cushion against his sawing efforts.

In the operation of my new and improved tree faller and undercutting device, the bar 4 is driven into the tree or the log. The holding bar 1 is then adjusted to the proper position on the bar 4 and locked thereto. The frame 7 is then adjusted to the proper location of the holding bar 1, the cut then can be made with the saw until it becomes necessary for further adjustments, as heretofore described.

I do not wish to be limited to the exact mechanical embodiment illustrated, as other modified forms may be readily adapted to my device still coming within the scope of my claims to follow.

What I claim is:

1. A tree faller and undercutting device including a holding bar formed at one end with a return bend portion of relatively short length, the upper portion of the holding bar being free of interruption throughout its length and presenting an edge formation upwardly, a tree engaging bar, the terminal of the short length of the holding bar being formed to removably secure the engaging bar to support the uninterrupted length of the holding bar above and spaced from the engaging bar, a frame resting on and slidably engaging the uninterrupted length of the holding bar, means for adjustably fixing the frame at varying points lengthwise the holding bar, said frame being formed at one end to provide a hollow guide frame wholly above the holding bar, a sub-frame having sliding and guiding connection with the guide frame, spring means for urging the sub-frame, in one direction of the guide frame, the sub-frame being extended to form an upper guide for a saw blade, and a lower guide for the saw blade supported by the sliding frame and limiting the movement of the sub-frame under said spring means.

2. A construction as defined in claim 1 wherein a roller is mounted in the sub-frame to provide an edge bearing for a saw blade positioned between the upper and lower guides.

3. A construction as defined in claim 1 wherein the lower guide is of materially greater width than the upper guide and formed with an upper convex surface.

JOHN T. PAULSON.